Sept. 20, 1938.  C. F. HILL ET AL  2,130,843
FIELD COIL COOLING MEANS FOR MOTORS
Filed Nov. 28, 1936
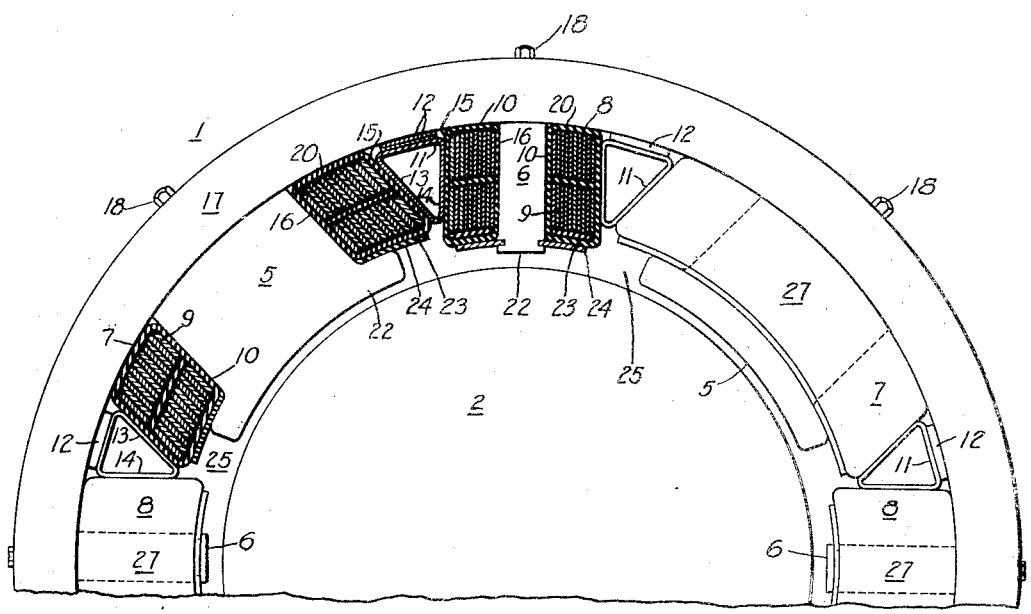
WITNESSES:
INVENTORS
Charles F. Hill, Maurice F. Jones,
and Clarence A. Atwell
BY
ATTORNEY Patented Sept. 20, 1938

2,130,843

UNITED STATES PATENT OFFICE 2,130,843

FIELD-COIL COOLING MEANS FOR MOTORS

Charles F. Hill, Wilkinsburg, Maurice F. Jones, Edgewood, and Clarence A. Atwell, Wilkinsburg, Pa., assignors to Westinghouse Electric & Manufacturing Company, East Pittsburgh, Pa., a corporation of Pennsylvania Application November 28, 1936, Serial No. 113,202

3 Claims. (Cl. 171—252)

Our invention relates to means for reducing the heating of the stator members of dynamo-electric machines, and it has particular relation to direct-current motors of the railway type.

A particular object of our invention is to prevent the unnecessary and wholly undesirable swelling of the field-coil insulation upon impregnation and to improve the ventilation of the field-coils.

For many years, railway motors have been made with impregnated field-coils, and the practice has been for the manufacturer to dip and bake the coils a number of times, to impregnate the insulation, before selling the motor, and for the purchaser of the motor to again dip and bake the motor from time to time throughout the life of the motor, for the purpose of guarding against insulation-breakdowns. The result of all these repeated impregnations is to make the insulation swell more and more, so that, for example, an insulation $\frac{1}{16}$ inch thick, which is sufficient for electrical insulation purposes, may become $\frac{3}{16}$ inch thick before the manufacturer finishes with the motor, and the insulation may become yet thicker under the administrations of the purchaser of the motor, the swollen insulation being afflicted with dead-air spaces which are particularly effective heat-insulators. Any insulation in addition to the minimum required to meet the electrical needs is a very grave disadvantage because it operates as a heat-insulator at the very place where the heat must be removed from the coils. In other words, the field-coils must be cooled by the conduction of heat through the insulation-walls enclosing the coils.

It is an object of our invention to provide a new structure, and a new method of fabrication, whereby wedge-shaped metallic ducts or plates are tightly wedged into the spaces between adjacent field-coils of dynamo-electric machines before the impregnation process, and subsequently the field-coil insulation is subjected to the impregnation treatment. In this manner the unwanted and wholly unnecessary swelling of the insulation is prevented.

Referring to our drawing, the single figure of which is a somewhat diagrammatic end view of a motor embodying our invention, with parts in section, we have shown a direct-current railway motor having a stator member 1 and an armature member 2. The stator member is of the salient field-pole construction, comprising a plurality of main and commutating field-poles 5 and 6, surrounded respectively by field-coils 7 and 8. The field-coils are illustrated as being of the strap-copper type in which the individual turns are first separately insulated with a very light or thin insulation 9, each whole coil being finally enclosed in impregnable insulation 10 of such thickness as is determined upon for giving the required electrical insulation-strength.

It will be noted that the spaces between the field-coils 7 and 8 are triangular in shape. According to our invention, these triangular spaces are filled by correspondingly shaped metallic ventilating ducts 11 which are inserted in the several spaces between the field coils and then wedged tightly in place, as by means of wedges 12 which are forced into place behind the wedge-shaped ducts so as to drive them tightly against the sides of the field coils. The principal feature about the ducts 11 is that they are provided with metallic side-walls or plates 13 and 14 which are pressed into tight heat-conducting and swelling-preventative engagement with the opposing sides of the field-coils which provide the (usually triangularly shaped) axially extending passages through the field-frame structure of the motor. The other walls of the ducts 11 constitute pressure-means for the pressure-walls 13 and 14 for preventing said pressure-walls 13 and 14 from moving together, said pressure-means being of such nature as to leave the axial ventilating passages open. The ducts should be made of non-magnetic material.

Due to the pliable condition of the untreated coil at the time of tightening the wedges or wedge-shaped ducts 11, the pressure exerted by the wedges is transmitted not only to the insulation-wall 15 adjacent to the wedge but also to all the conductors of the coil and through these conductors to the other insulating wall 16, the pressure being resisted finally by the side of the pole 5 or 6, as the case may be.

The preferred sequence of operations is that the poles 5 and 6, the coils 7 and 8, and the metallic ducts 11 shall be assembled in the magnetizable cylindrical frame member or yoke 17, and the bolts 18 which hold the poles 5 and 6 be put in place but not tightened. The wedge-shaped ducts 11 should then be forced inwardly, as by means of the wedges 12, and the pole-bolts 18 then tightened. In this way the insulation-walls 10 are effectively compressed on all sides of the coils and held in intimate contact with the surfaces to which they are to transfer the heat.

Subsequent to the assembly of the frame, coils, poles and ducts as described above, the assembled field-frame member 1 is given the usual impregnating treatment which frequently takes the form of dipping the members into impregnating vats under vacuum, with subsequent varnishing and baking treatments, which may be repeated several times.

There are five principal paths by which the heat flows outwardly from the coils 7 and 8, the first, and usually the most important, being (1) directly through the insulation-wall 15 to the ventilating air which is drawn or blown axially through the spaces (occupied by our novel ducts 11) between the adjacent coils 7 and 8. The other paths are (2) through the insulating wall 20 on the frame-side of the coils, through the frame-metal 17 in various directions to both internal and external surfaces which are ultimately cooled by air; (3) through the insulating wall 16 on the pole-side of the coil, through the pole 5 or 6, as the case may be, to the frame 17 in one direction, and through the pole to the pole-face 22 in the other direction, and thence to the ultimate point of transfer to air; (4) through the insulation-wall 23 on the surface toward the armature 2, into the pole-washer 24 and thence to air drawn or blown through the clearance-space 25 between the coil 7 or 8 and the armature 2; and (5) through the insulation 27 on the end-portion of the coils and thence to the air. The heat per unit surface of this last-named path is usually small due to the low air velocity past such surfaces, and therefore it is relatively not so important to keep the thickness of insulation down on the end portions of the coils.

As will become evident from the description of our invention, the flow of heat from the coil 7 or 8 is materially improved in four out of the five paths mentioned above by means of the construction herein described.

It will be noted that, according to our invention the dimensions of the outside insulating walls 10 on the field-coils 7 and 8 (except the end portions 27 of the coils) are confined so as to avoid swelling during the impregnation-treatment. The coils 7 and 8 are assembled in the stator member 1 before impregnation so that they are, at the time of assembly, somewhat pliable and therefore may be forced, with moderate pressure applied as described hereinabove, into close conformity with the frame-member 17, the sides of the pole-pieces 5 and 6, and the pole-washers 24 or tips 22, by means of special hollow wedges 11 or plates 13 and 14 between coils, such wedges or plates forming a passage for cooling air and subsequently the field-coil insulation 10 is subjected to the impregnation treatment. In this manner the unwanted and wholly unnecessary swelling of the insulation is prevented. Furthermore, the wedge-shaped ventilating ducts 11 provide smooth-walled ducts through which the ventilating air may freely pass, as distinguished from the irregularly bulging sides of impregnated field-coils as in previous constructions.

Tests have demonstrated a phenomenal improvement of 60 or 70% in the cooling of motor field-coils by the use of our invention.

It will be obvious that the ventilating ducts may assume different configurations according to the configuration of the spaces between the coils, and that various changes may be resorted to in the exact constructional details of the ducts, and in the precise means adopted for forcing the side walls of the ducts into tight engagement against the sides of the field coils. The foregoing and other changes may be made by those skilled in the art without departing from the essential spirit of our invention. We desire, therefore, that the appended claims shall be accorded the broadest construction consistent with their language and the prior art.

We claim as our invention:

1. The method of fabricating the field-frame member of a salient-pole dynamo-electric machine comprising the steps of placing, on the respective salient poles, field-coil members having impregnable insulating material for insulating the coils, tightly wedging a plurality of wedge-shaped metallic ducts in the spaces between adjacent field-coils, so as to mitigate subsequent expansion of the coil insulation, and subsequently subjecting said insulation to an impregnation treatment.

2. The method of fabricating the field-frame member of a salient-pole dynamo-electric machine comprising the steps of placing, on the respective salient poles, field-coil members having impregnable insulating material for insulating the coils, tightly wedging a plurality of metallic plate-members against the opposing sides of the coils in the spaces between adjacent field coils, so as to mitigate subsequent expansion of the coil-insulation, and subsequently subjecting said insulation to an impregnation treatment.

3. The method of fabricating the field-frame member of a salient-pole dynamo-electric machine employing a certain sequence of operations comprising the steps of placing, on the respective salient poles, pliable field-coil members having impregnable insulating material for insulating the coils, assembling the coils and poles in the frame-member but without bolting the poles and coils tightly in place, tightly fitting a plurality of metallic ventilating duct-members into the spaces between adjacent field coils, subsequently tightening the bolts holding the poles, with coils assembled thereon in place in the frame, and then subjecting the insulating material to an impregnating treatment.

CHARLES F. HILL.
MAURICE F. JONES.
CLARENCE A. ATWELL.